(12) United States Patent
Chao et al.

(10) Patent No.: US 10,996,465 B2
(45) Date of Patent: *May 4, 2021

(54) PROJECTION DEVICE

(71) Applicant: Coretronic Corporation, Hsin-Chu (TW)

(72) Inventors: Chin-Sheng Chao, Hsin-Chu (TW); Chuan-Te Cheng, Hsin-Chu (TW); Chih-Wei Shih, Hsin-Chu (TW); Meng-Hsuan Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 154 days.

This patent is subject to a terminal disclaimer.

(21) Appl. No.: 16/214,136

(22) Filed: Dec. 10, 2018

(65) Prior Publication Data
US 2019/0250401 A1    Aug. 15, 2019

(30) Foreign Application Priority Data

Feb. 13, 2018 (CN) .......................... 201810148898.5

(51) Int. Cl.
*G02B 27/01* (2006.01)
*G03B 21/14* (2006.01)
(Continued)

(52) U.S. Cl.
CPC ......... *G02B 27/0081* (2013.01); *G02B 7/003* (2013.01); *G02B 27/0172* (2013.01);
(Continued)

(58) Field of Classification Search
CPC ............ G02B 27/0081; G02B 27/0176; G02B 30/26; G02B 27/0172; G02B 27/0179;
(Continued)

(56) References Cited

U.S. PATENT DOCUMENTS

| 5,430,575 A | 7/1995 | Sudarshan et al. |
| 6,416,183 B1 | 7/2002 | Colpaert et al. |

(Continued)

FOREIGN PATENT DOCUMENTS

| CN | 1710486 | 12/2005 |
| CN | 102314059 | 1/2012 |

(Continued)

OTHER PUBLICATIONS

"Search Report of Europe Counterpart Application," dated Sep. 13, 2019, pp. 1-15.

(Continued)

*Primary Examiner* — Kristina M Deherrera
(74) *Attorney, Agent, or Firm* — JCIPRNET

(57) ABSTRACT

A projection device includes at least one projection module and at least one adjusting structure. The projection module has an optical axis and is adapted to emit an image beam. The image beam is transmitted to a projection target to form a projection image. The adjusting structure includes a base and an adjusting component. The adjusting component is rotatably connected to the base along a first axis, and the projection module is rotatably connected to the adjusting component along the optical axis. The adjusting component and the projection module are adapted to rotate along the first axis such that the projection image moves vertically, and the projection module is adapted to rotate along the optical axis such that the projection image rotates.

14 Claims, 12 Drawing Sheets

(51) Int. Cl.
*G02B 27/00* (2006.01)
*G02B 7/00* (2021.01)
*G02B 30/26* (2020.01)
*G03B 21/20* (2006.01)
*G03B 33/12* (2006.01)

(52) U.S. Cl.
CPC ..... *G02B 27/0176* (2013.01); *G02B 27/0179* (2013.01); *G02B 30/26* (2020.01); *G03B 21/142* (2013.01); *G03B 21/145* (2013.01); *G03B 21/147* (2013.01); *G03B 21/2066* (2013.01); *G03B 33/12* (2013.01)

(58) Field of Classification Search
CPC ................ G03B 21/145; G03B 21/147; G03B 21/2066; G03B 33/12; G03B 21/142
USPC .......................................................... 359/618
See application file for complete search history.

(56) References Cited

U.S. PATENT DOCUMENTS

| | | | |
|---|---|---|---|
| 7,576,916 B2 | 8/2009 | Amitai | |
| 8,104,898 B2 | 1/2012 | Liao et al. | |
| 10,545,394 B2* | 1/2020 | Cheng | G03B 21/142 |
| 2003/0021037 A1 | 1/2003 | Nemes | |
| 2004/0201824 A1 | 10/2004 | Wada et al. | |
| 2005/0024596 A1* | 2/2005 | Kuroda | G03B 21/142 |
| | | | 353/34 |
| 2007/0109778 A1 | 5/2007 | Chang et al. | |
| 2007/0121080 A1 | 5/2007 | Hsu et al. | |
| 2007/0146651 A1* | 6/2007 | Lee | G03B 21/142 |
| | | | 353/101 |
| 2008/0240668 A1 | 10/2008 | Miyata | |
| 2010/0091254 A1 | 4/2010 | Travis et al. | |
| 2011/0157707 A1 | 6/2011 | Tilleman et al. | |
| 2015/0022789 A1 | 1/2015 | Sato | |
| 2015/0029406 A1 | 1/2015 | Shinha et al. | |
| 2015/0277123 A1 | 10/2015 | Chaum et al. | |
| 2015/0301360 A1 | 10/2015 | Chow et al. | |
| 2015/0355781 A1 | 12/2015 | Lin et al. | |
| 2016/0313631 A1 | 10/2016 | Sugawara et al. | |
| 2016/0363746 A1 | 12/2016 | Minefuji | |
| 2017/0176756 A1 | 6/2017 | Takahashi | |
| 2017/0184860 A1 | 6/2017 | Huang | |
| 2017/0277025 A1* | 9/2017 | Kasuga | F16M 13/027 |
| 2019/0113760 A1 | 4/2019 | Tatsuta | |

FOREIGN PATENT DOCUMENTS

| | | |
|---|---|---|
| CN | 103365057 | 10/2013 |
| CN | 203413305 | 1/2014 |
| CN | 103984197 | 8/2014 |
| CN | 203786393 | 8/2014 |
| CN | 106814529 | 6/2017 |
| CN | 109946909 | 6/2019 |
| EP | 0939548 | 9/1999 |
| EP | 1791329 | 5/2007 |
| JP | 2014123028 | 7/2014 |
| TW | 300288 | 3/1997 |
| TW | 575199 | 2/2004 |
| TW | 200624870 | 7/2006 |
| TW | I280450 | 5/2007 |
| TW | 200809292 | 2/2008 |
| TW | 200830025 | 7/2008 |
| TW | 200900834 | 1/2009 |
| TW | 201126249 | 8/2011 |
| TW | M433567 | 7/2012 |
| TW | 201704814 | 2/2017 |
| TW | 201715275 | 5/2017 |
| WO | 2006030862 | 3/2006 |
| WO | 2017037708 | 3/2017 |
| WO | 2018003084 | 1/2018 |

OTHER PUBLICATIONS

"Search Report of Europe Counterpart Application", dated May 29, 2019, pp. 1-16.

* cited by examiner

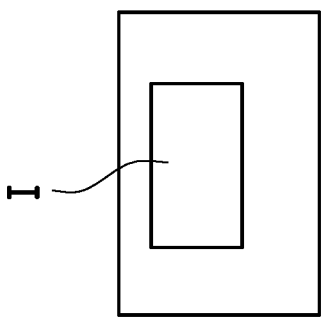
FIG. 7D
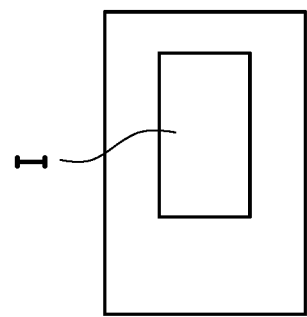
FIG. 7C
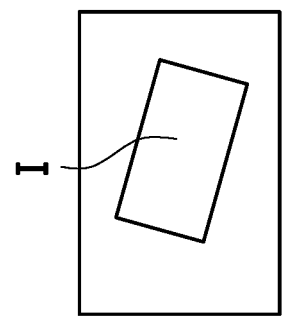
FIG. 7G
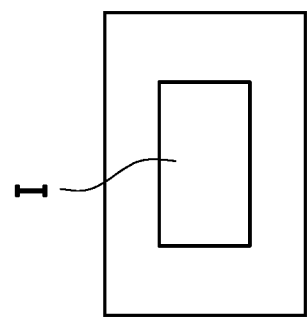
FIG. 7A
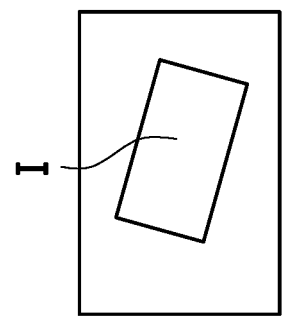
FIG. 7B
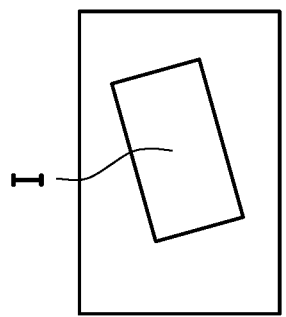
FIG. 7F
FIG. 7E

PROJECTION DEVICE

CROSS-REFERENCE TO RELATED APPLICATION

This application claims the priority benefit of China application serial no. 201810148898.5, filed on Feb. 13, 2018. The entirety of the above-mentioned patent application is hereby incorporated by reference herein and made a part of this specification.

BACKGROUND OF THE INVENTION

Field of the Invention

The disclosure relates to a projection device, and in particular, to a projection device including an adjusting structure and belonging to a near eye display device.

Description of Related Art

Nowadays, virtual reality (VR) and augmented reality (AR) technologies have been gradually applied in consumer electronic products such as VR displays and AR displays. The AR display uses its two projection devices to project two virtual images to the human eyes and overlaps the two virtual images to present a 3D image. Specifically, an image beam projected by the projection device is incident to a waveguide plate and is transmitted forward, and is finally projected outward from an outlet of the waveguide plate. After the image beams distributed at different angles projected from the waveguide plate enter the human eyes, the image beams are focused by the lens of the human eyes on the retina to generate a projection image.

In terms of adjustment in conventional projection devices, if the projection device moves horizontally/vertically, its projection image will also move horizontally/vertically accordingly; if the projection device rotates horizontally or rotates vertically, its projection image will be deformed (supposing that the projection image is ideally rectangular). Adjustment of AR projection devices is different from that described above. In the AR projection device, when the image beams of different emission angles from the waveguide plate are transmitted to the human eyes, the image perceived by the human eyes is an image distributed in an angle space converted by the waveguide plate. If the projection device moves horizontally/vertically, it only affects energy of entering light incident to the waveguide plate, and the image distributed in the angle space will only be darkened and will not move accordingly. If the image distributed in the angle space is to be moved horizontally/vertically, it is necessary to adjust an angle at which incident light enters the waveguide plate. How to fully adjust the projection image projected by the projection device to overlap two virtual images together and present a 3D image is one of the issues in designing AR projection devices.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The embodiments of the invention provide a projection device that fully adjusts movement and rotation of a projection image and is adapted to be used in augmented reality (AR) applications.

Other purposes and advantages of the embodiments of the invention may be further understood according to the technical features disclosed herein.

To achieve one, part, or all of the foregoing purposes or other purposes, an embodiment of the invention provides a projection device including at least one projection module and at least one adjusting structure. The projection module has an optical axis and is adapted to emit an image beam, and the image beam is transmitted to a projection target to form a projection image. The adjusting structure includes a base and an adjusting component. The adjusting component is rotatably connected to the base along a first axis, and the projection module is rotatably connected to the adjusting component along the optical axis. The adjusting component and the projection module are adapted to rotate along the first axis such that the projection image moves vertically, and the projection module is adapted to rotate along the optical axis such that the projection image rotates.

Accordingly, the embodiments of the invention at least exhibit one of the advantages or effects below. In the projection device of the embodiments of the invention, the adjusting structure drives the projection module to rotate through rotation of the adjusting component of the adjusting structure with respect to the base, such that corresponding movement is generated in the projection image. Moreover, the adjusting structure generates corresponding rotation in the projection image through rotation of the projection module with respect to the adjusting component. Accordingly, movement and rotation of the projection image can be fully adjusted.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A to FIG. 7G illustrate movement and rotation of a projection image.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
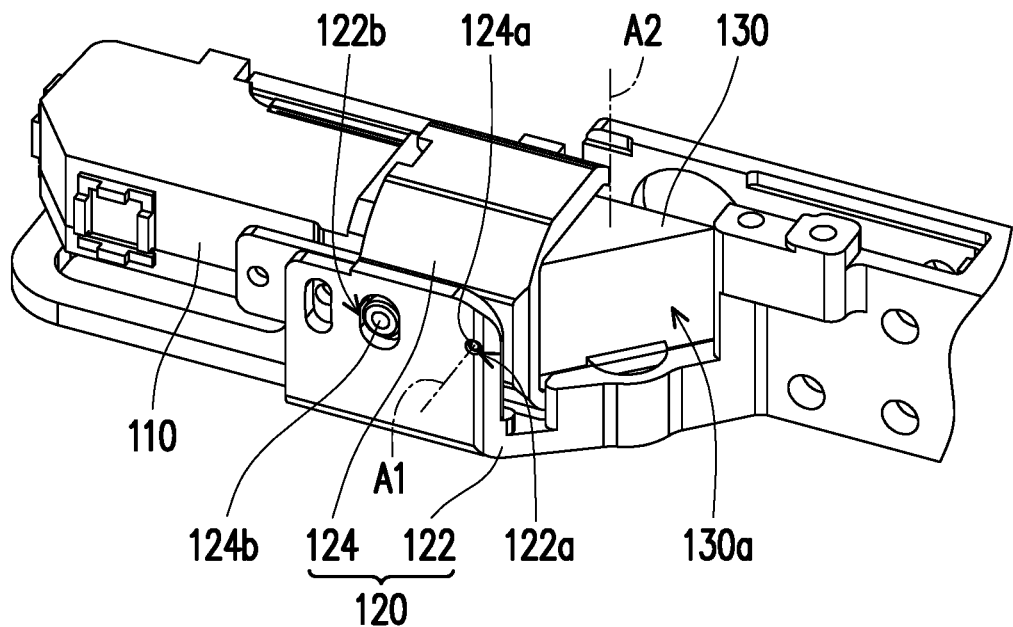
FIG. 1 is a perspective view illustrating a projection device according to an embodiment of the invention.
Figure 2:
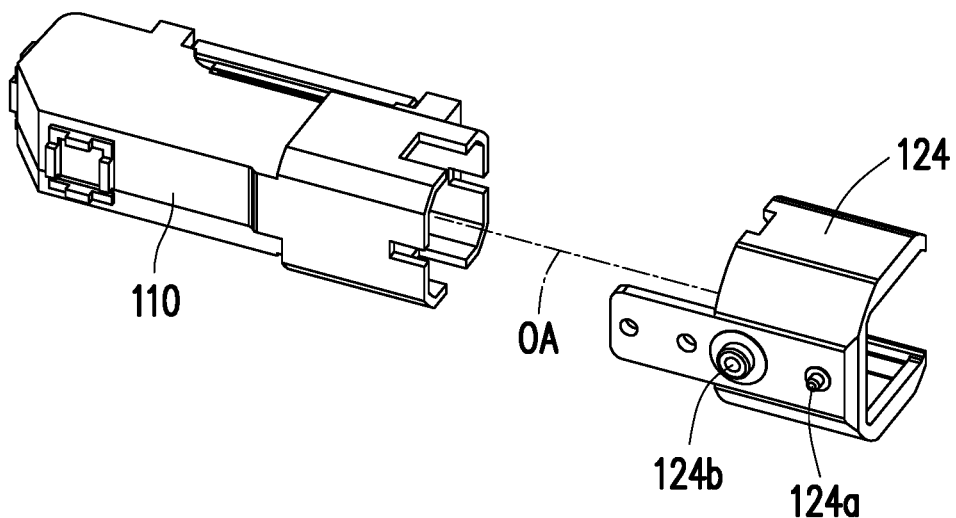
FIG. 2 is an exploded view of a projection module and an adjusting component of FIG. 1.

FIG. 1 is a perspective view illustrating a projection device according to an embodiment of the invention. FIG. 2 is an exploded view of a projection module and an adjusting component of FIG. 1. Referring to FIG. 1 and FIG. 2, a projection device 100 of the present embodiment includes at least one projection module 110, at least one adjusting structure 120, and at least one reflecting component 130. The projection module 110 is adapted to emit an image beam. The reflecting component 130 is disposed on an optical axis OA and includes a reflecting surface 130a. The reflecting surface 130a is adapted to reflect the image beam. The image beam is reflected by the reflecting surface 130a and is transmitted to a projection target to form a projection image. The projection target is, for example, human eyes. In other embodiments, the projection device 100 includes the projection module 110 and at least one adjusting structure 120. The projection module 110 is adapted to emit an image beam. The image beam is transmitted to a projection target to form a projection image.

Figure 3:
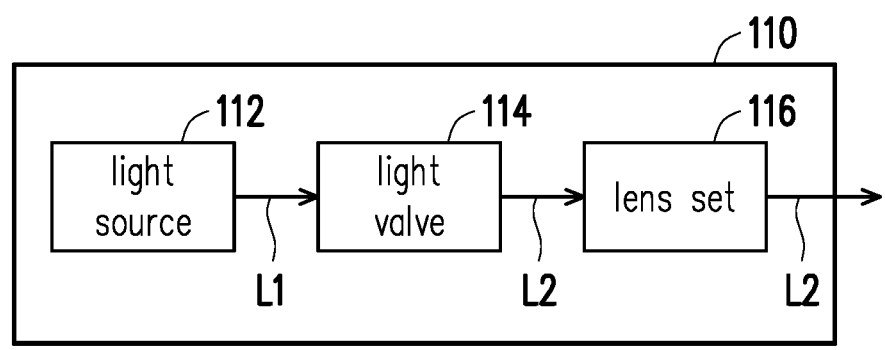
FIG. 3 is schematic diagram illustrating the projection module of FIG. 1.

FIG. 3 is schematic diagram illustrating the projection module of FIG. 1. Referring to FIG. 3, the projection module 110 of the present embodiment includes a light source 112, a light valve 114, and a lens set 116. The light source 112 is, for example, a light emitting diode or a laser diode. The light source 112 is adapted to emit an illumination beam L1. The light valve 114 includes, for example, a Digital Light Processing™ (DLP™) system, a liquid-crystal display (LCD), or a liquid crystal on silicon (LCoS) system. The light valve 114 is located on a transmission path of the illumination beam L1 and is adapted to convert the illumination beam L1 into an image beam L2. The lens set 116 is, for example, formed of one or more lenses. The lens set 116 is located on a transmission path of the image beam L2 and is adapted to project the image beam L2 outward.

In the present embodiment, a number of the projection module 110 of the projection device 100 is, for example, two (only one projection module 110 is illustrated in FIG. 1) to respectively correspond to both eyes of a user. A number of the adjusting structure 120 may also be two (only one adjusting structure 120 is illustrated in FIG. 1) to respectively correspond to the two projection modules 110. The projection image is, for example, a magnified virtual image. Each of the adjusting structures 120 is adapted to drive the corresponding projection module 110 to move and rotate, such that two projection images formed by the two projection modules 110 overlap through adjustment by the two adjusting structures 120 to obtain a clear and bright projection image.

In other embodiments, the projection device 100 may use one projection module 110 and one adjusting structure 120. The adjusting structure 120 is adapted to drive the corresponding projection module 110 to move and rotate, such that the projection image formed by the projection module 110 is adjusted by the adjusting structure 120 to obtain a clear and bright projection image to be viewed with a single eye.

In other embodiments, the projection device 100 may use one projection module 110 and one adjusting structure 120. An optical element (not illustrated) is used to split and guide the image beam L2 respectively to the two human eyes. The adjusting structure 120 is adapted to drive the corresponding projection module 110 to move and rotate, such that the projection images formed by the projection module 110 overlap through adjustment by the adjusting structure 120 to obtain a clear and bright projection image.

Specifically, the adjusting structure 120 includes a base 122 and an adjusting component 124. The adjusting component 124 is rotatably connected to the base 122 along a first axis A1, and the projection module 110 is rotatably connected to the adjusting component 124 along the optical axis OA. Moreover, the reflecting component 130 is rotatably connected to the base 122 along a second axis A2. In the present embodiment, the first axis A1, the second axis A2, and the optical axis OA are perpendicular to each other, and the first axis A1 and the second axis A2 respectively intersect with the optical axis OA. The optical axis OA is defined as a direction in which the projection module 110 projects the image beam L2.

Figure 4A:
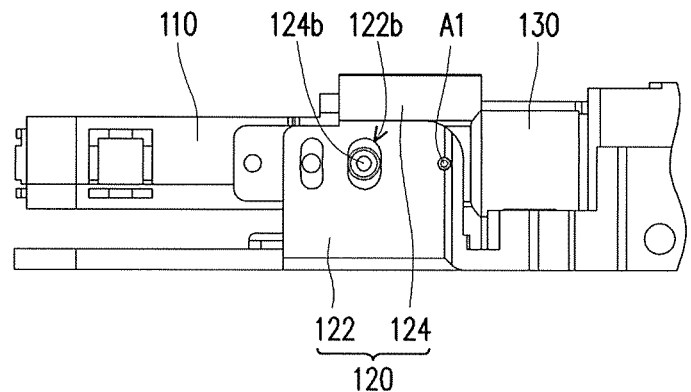
FIG. 4A to FIG. 4C illustrate rotation of the adjusting component and the projection module of FIG. 1 along a first axis.
Figure 4B:
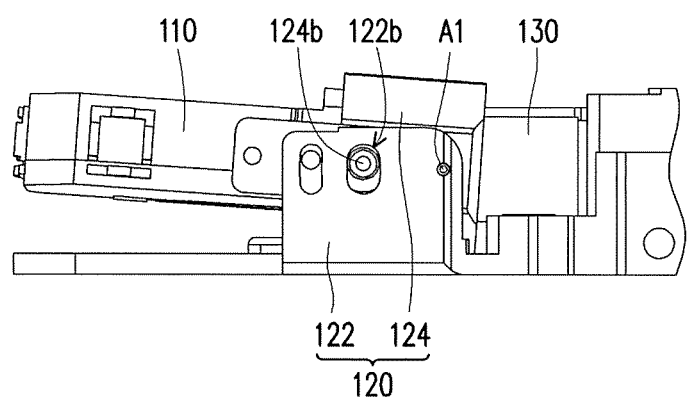
Figure 4C:
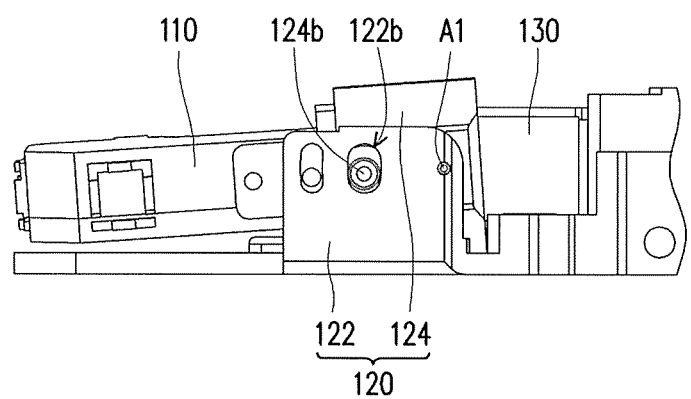
Figure 5A:
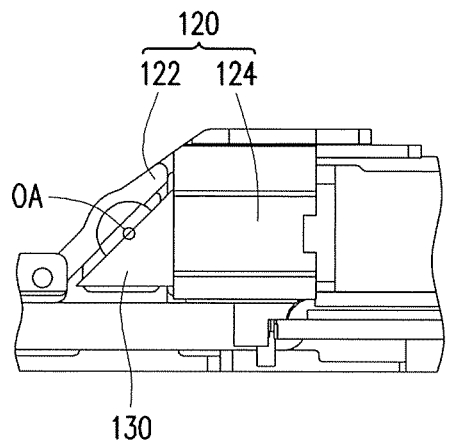
FIG. 5A to FIG. 5C illustrate rotation of a reflecting component of FIG. 1 along a second axis.
Figure 5B:
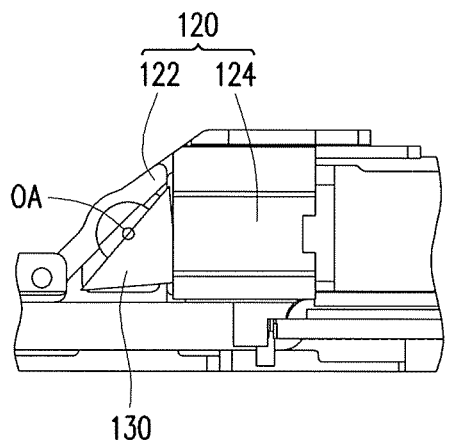
Figure 5C:
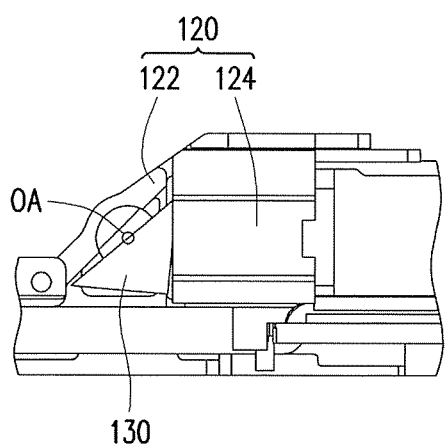
Figure 6A:
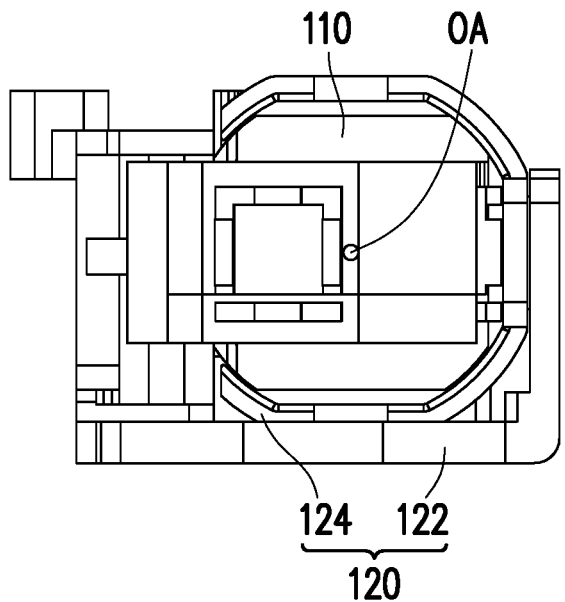
FIG. 6A to FIG. 6C illustrate rotation of the projection module of FIG. 1 along an optical axis.
Figure 6B:
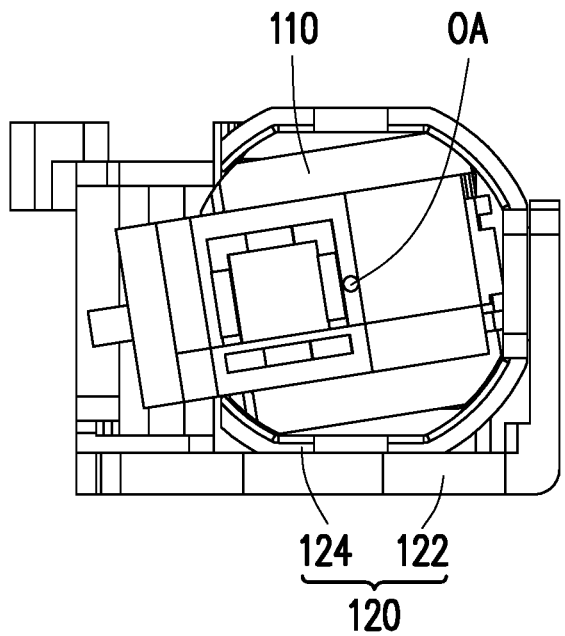
Figure 6C:
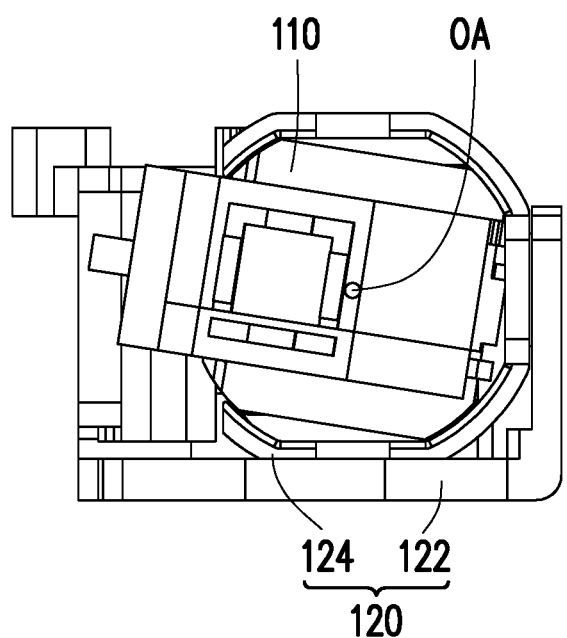

FIG. 4A to FIG. 4C illustrate rotation of the adjusting component and the projection module of FIG. 1 along the first axis. FIG. 5A to FIG. 5C illustrate rotation of the reflecting component of FIG. 1 along the second axis. FIG. 6A to FIG. 6C illustrate rotation of the projection module of FIG. 1 along the optical axis (in a viewing angle from the projection module toward the adjusting component). FIG. 7A to FIG. 7G illustrate movement and rotation of the projection image. The adjusting component 124 and the projection module 110 are adapted to rotate along the first axis A1 from a state shown in FIG. 4A to a state shown in FIG. 4B or FIG. 4C, such that the projection image (labeled as a projection image I in FIG. 7A to FIG. 7G) vertically moves from a state shown in FIG. 7A to a state shown in FIG. 7E or FIG. 7D. The reflecting component 130 is adapted to rotate along the second axis A2 from a state shown in FIG. 5A to a state shown in FIG. 5B or FIG. 5C, such that the projection image horizontally moves from a state shown in FIG. 7A to a state shown in FIG. 7C or FIG. 7B. The projection module 110 is adapted to rotate along the optical axis OA from a state shown in FIG. 6A to a state shown in FIG. 6B or FIG. 6C, such that the projection image rotates from a state shown in FIG. 7A to a state shown in FIG. 7F or FIG. 7G.

As described above, the adjusting structure 120 drives the projection module 110 to rotate along the first axis A1 through rotation of the adjusting component 124 with respect to the base 122, such that corresponding vertical movement is generated in the projection image. The adjusting structure 120 generates corresponding rotation in the projection image through rotation of the projection module 110 along the optical axis OA with respect to the adjusting component 124. Moreover, the reflecting component 130 rotates along the second axis A2 to generate corresponding horizontal movement in the projection image. Accordingly, movement and rotation of the projection image can be fully adjusted.

Figure 8:
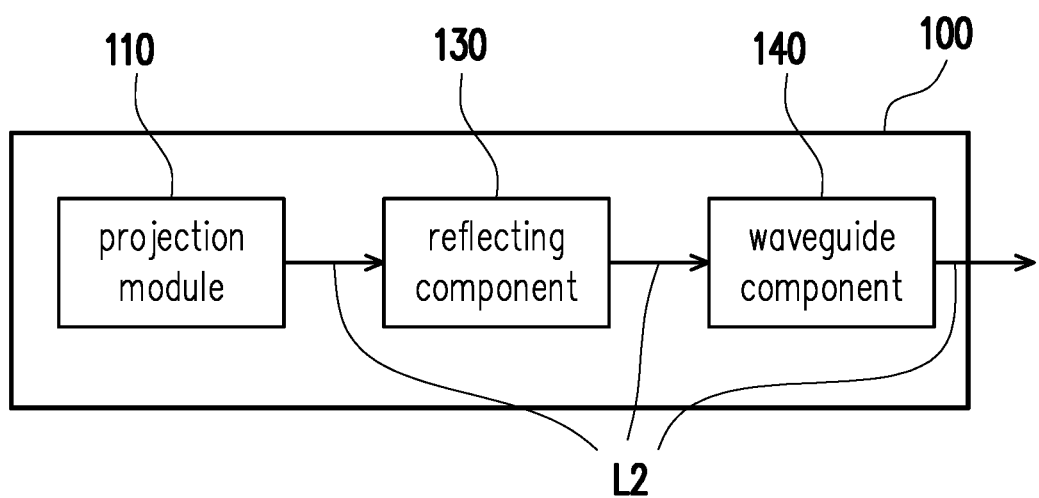
FIG. 8 is a schematic diagram illustrating a projection device according to another embodiment of the invention.

FIG. 8 is a schematic diagram illustrating a projection device according to another embodiment of the invention. In the present embodiment, the projection device 100 further includes a waveguide component 140. The image beam L2 reflected by the reflecting component 130 passes through the waveguide component 140 and then arrives at the projection target to form the projection image. The reflecting component 130 is, for example, a total reflection prism module. The waveguide component 140 is, for example, a waveguide plate. A number of the waveguide component 140 may be one or more and may be adjusted according to the design. However, the embodiments of the invention are not limited hereto.

Figure 9:
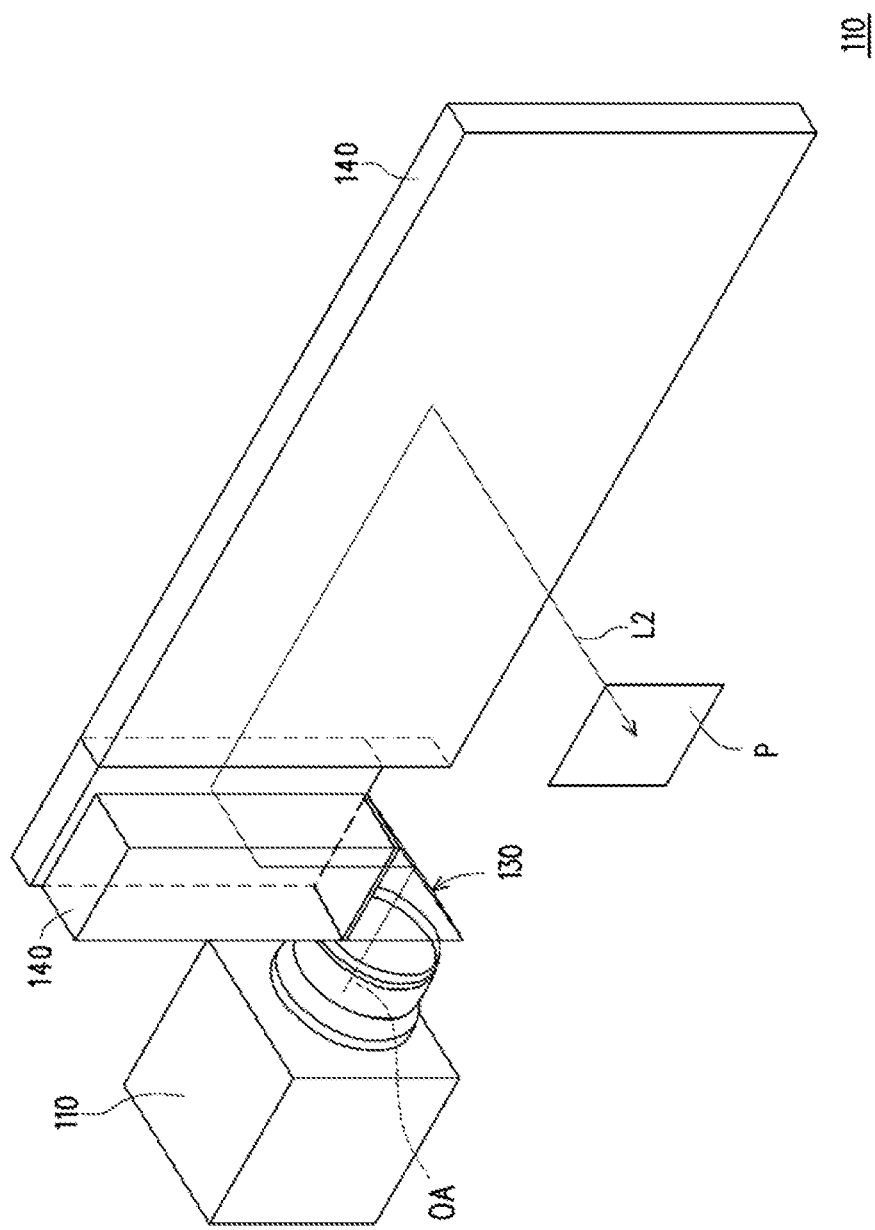
FIG. 9 is a schematic diagram illustrating a projection device according to another embodiment of the invention.
Figure 10:
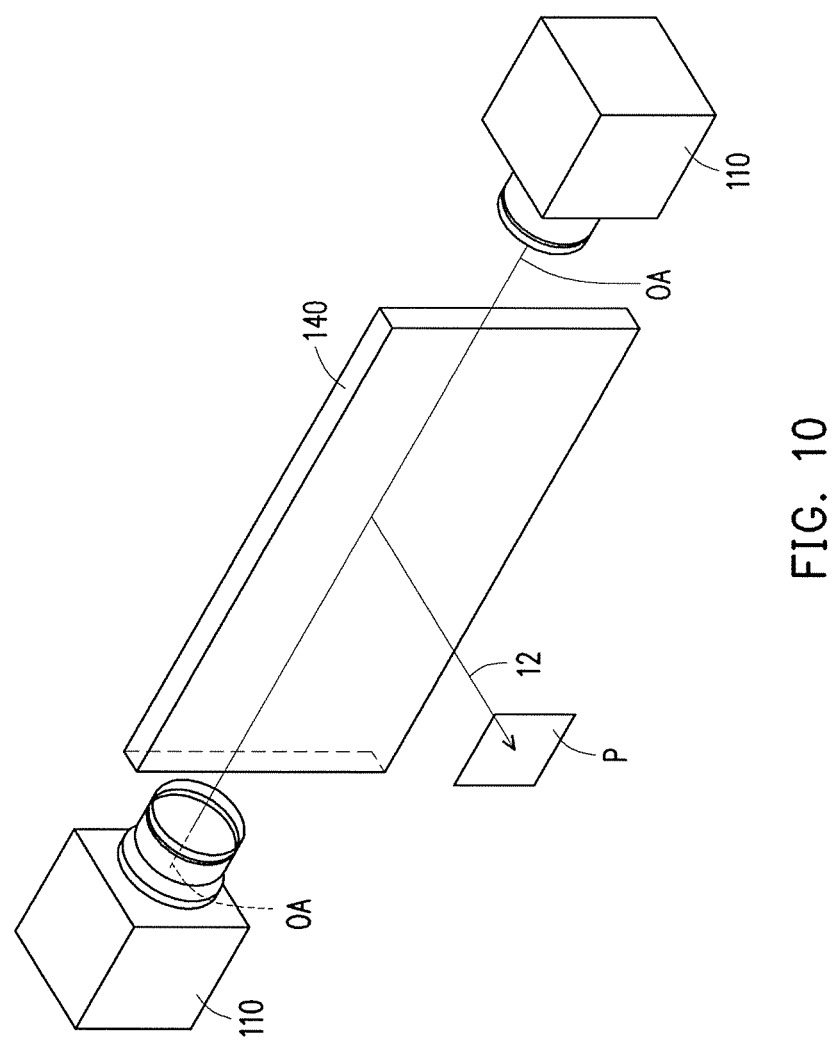
FIG. 10 is a schematic diagram illustrating a projection device according to another embodiment of the invention.

FIG. 9 is a schematic diagram illustrating a projection device according to another embodiment of the invention. FIG. 10 is a schematic diagram illustrating a projection device according to another embodiment of the invention. Referring to FIG. 9, in the present embodiment, the projection device 100 includes two waveguide components 140. The image beam L2 reflected by the reflecting component 130 passes through the waveguide components 140 and then arrives at the projection target P via transmission of the two waveguide components 140 to form the projection image. Specifically, the reflecting component 130 includes a reflecting surface. Referring to FIG. 10, the technical difference from FIG. 9 lies in that, in the present embodiment, the projection device 100 includes one single waveguide component 140, and the reflecting component is not required. The image beam L2 projected by the projection module 110 directly enters the one single waveguide component 140. The image beam L2 is transmitted to the projection target P via transmission of the one single waveguide component 140 to form the projection image. The embodiments of the invention do not limit the number of the waveguide component 140.

Referring to FIG. 1, in the embodiments of the invention, the adjusting component 124 is, for example, a sleeve. The sleeve is fit around a front end of the projection module 110. The sleeve may be rotatably connected to the front end of the projection module 110 by means of threaded joint (screw thread joint) or another suitable method, which is not limited in the embodiments of the invention. On the other hand, the adjusting component 124 includes a pivoting portion 124a and a sliding portion 124b, and the base 122 has a pivot hole 122a and a slide groove 122b. The pivoting portion 124a is pivotally connected to the pivot hole 122a of the base 122 along the first axis A1. The sliding portion 124b is slidably disposed in the slide groove 122b of the base 122, and the sliding portion 124b slides along the base 122 along with pivotal rotation of the adjusting component 124.

To prevent the reflecting component 130 and the projection module 110 from abutting against each other and thus obstructing rotation of the reflecting component 130 and rotation of the projection module 110, in the present embodiment, a gap (not illustrated) of about 0.4 mm is present between the reflecting component 130 and the projection module 110 and is used to provide a space for rotation of the reflecting component 130 along the second axis A2 and a space for rotation of the projection module 110 along the first axis A1. A size of the gap between the reflecting component 130 and the projection module 110 determines an angle range of rotation of the reflecting component 130 along the second axis A2 and an angle range of rotation of the projection module 110 along the first axis A1. For example, the angle range of rotation of the reflecting component 130 along the second axis A2 may be 10 degrees, and the angle range of rotation of the projection module 110 along the first axis A1 may be 10 degrees. Moreover, an angle range of rotation of the projection module 110 along the optical axis OA may also be 10 degrees, for example. The embodiments of the invention are not limited to the angle range above.

In summary of the above, the adjusting structure drives the projection module to rotate along the first axis through rotation of the adjusting component of the adjusting structure with respect to the base, such that corresponding vertical movement is generated in the projection image. The adjusting structure generates corresponding rotation in the projection image through rotation of the projection module along the optical axis with respect to the adjusting component. Moreover, the reflecting component rotates along the second axis to generate corresponding horizontal movement in the projection image. Accordingly, movement and rotation of the projection image can be fully adjusted. The embodiments of the invention provide a projection device that fully adjusts movement and rotation of the projection image and is adapted to be used in augmented reality (AR) or virtual reality (VR) applications.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device comprising:
   at least one projection module having an optical axis, wherein the projection module is adapted to emit an image beam, and the image beam is transmitted to a projection target to form a projection image; and
   at least one adjusting structure comprising a base and an adjusting component, wherein the adjusting component is rotatably connected to the base along a first axis, the at least one projection module is rotatably connected to the adjusting component along the optical axis, and the first axis is perpendicular to the optical axis,
   wherein the adjusting component and the projection module are adapted to rotate along the first axis such that the projection image moves vertically, and the projection module is adapted to rotate along the optical axis such that the projection image rotates, the adjusting component comprises a pivoting portion and a sliding portion, the pivoting portion is pivotally connected to the base along the first axis, and the sliding portion is slidably disposed on the base and is adapted to slide along the base along with pivotal rotation of the adjusting component.

2. The projection device of claim 1, further comprising at least one reflecting component disposed on the optical axis and comprising a reflecting surface, wherein the reflecting surface is adapted to reflect the image beam, and the image beam is reflected by the reflecting surface to the projection target to form the projection image.

3. The projection device of claim 2, wherein the at least one reflecting component is rotatably connected to the base along a second axis, and the reflecting component is adapted to rotate along the second axis such that the projection image moves horizontally.

4. The projection device of claim 3, wherein the first axis and the second axis intersect with the optical axis.

5. The projection device of claim 3, wherein the first axis, the second axis, and the optical axis are perpendicular to each other.

6. The projection device of claim 2, wherein a gap is present between the reflecting component and the projection module.

7. The projection device of claim 1, wherein the adjusting component is a sleeve, and the sleeve is fit around at least a portion of the projection module.

8. The projection device of claim 7, wherein the sleeve is threadedly jointed to the projection module.

9. The projection device of claim 1, wherein the base has a pivot hole, and the pivoting portion is pivotally connected to the pivot hole.

10. The projection device of claim 1, wherein the base has a slide groove, and the sliding portion is slidably disposed in the slide groove.

11. The projection device of claim 1, wherein the projection module comprises a light source, a light valve, and a lens set, wherein the light source is adapted to emit an illumination beam, the light valve is located on a transmission path of the illumination beam and is adapted to convert the illumination beam into the image beam, and the lens set is located on a transmission path of the image beam and is adapted to transmit the image beam to outside the projection module.

12. The projection device of claim 1, further comprising at least one waveguide component, wherein the image beam passes through the at least one waveguide component and then forms the projection image.

13. The projection device of claim 1, wherein the projection image is a virtual image.

14. The projection device of claim 1, wherein the at least one projection module comprises two of the projection modules, the at least one adjusting structure comprises two of the adjusting structures respectively corresponding to the two projection modules, and two of the projection images formed by the two projection modules overlap with each other through adjustment by the two adjusting structures.

* * * * *